United States Patent
Liou et al.

(10) Patent No.: US 11,875,560 B2
(45) Date of Patent: Jan. 16, 2024

(54) UNMANNED AERIAL VEHICLE AND IMAGE RECOGNITION METHOD THEREOF

(71) Applicant: Coretronic Corporation, Hsin-Chu (TW)

(72) Inventors: Yi-Fan Liou, Hsin-Chu (TW); Su-Yun Yu, Hsin-Chu (TW); Kui-Ting Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 202 days.

(21) Appl. No.: 17/203,735

(22) Filed: Mar. 16, 2021

(65) Prior Publication Data

US 2021/0291980 A1  Sep. 23, 2021

(30) Foreign Application Priority Data

Mar. 18, 2020 (CN) .......................... 202010189501.4

(51) Int. Cl.
| | | |
|---|---|---|
| B64C 39/02 | (2023.01) | |
| G06V 20/64 | (2022.01) | |
| G06F 18/213 | (2023.01) | |
| G06V 10/25 | (2022.01) | |
| G06V 20/17 | (2022.01) | |
| B64U 101/30 | (2023.01) | |

(52) U.S. Cl.
CPC ............ *G06V 20/17* (2022.01); *B64C 39/024* (2013.01); *G06F 18/213* (2023.01); *G06V 10/25* (2022.01); *G06V 20/64* (2022.01); *B64U 2101/30* (2023.01)

(58) Field of Classification Search
CPC ........ G06V 20/13; G06V 10/25; G06V 20/64; G06F 18/213; B64C 39/024; B64U 2101/30
See application file for complete search history.

(56) References Cited

U.S. PATENT DOCUMENTS

| | | | |
|---|---|---|---|
| 7,831,087 B2 * | 11/2010 | Harville | ................. G06V 20/64 382/209 |
| 9,147,260 B2 | 9/2015 | Hampapur et al. | |
| 9,390,506 B1 * | 7/2016 | Asvatha Narayanan | .................... G06T 7/194 |

(Continued)

FOREIGN PATENT DOCUMENTS

| | | |
|---|---|---|
| CN | 103500322 | 1/2014 |
| CN | 102103753 | 9/2016 |

(Continued)

OTHER PUBLICATIONS

Redmon et al, "You Only Look Once: Unified, Real-Time Object Detection", May 2016, ARXIV (cornell university), whole document (Year: 2016).*

(Continued)

*Primary Examiner* — Hussein Elchanti
*Assistant Examiner* — Kenneth M Dunne
(74) *Attorney, Agent, or Firm* — JCIPRNET

(57) ABSTRACT

The image recognition method includes: obtaining an image data stream, wherein the image data frame includes a current frame; performing image recognition on an object in the current frame to generate a first box corresponding to the current frame; detecting movement of the object to generate a second box corresponding to the current frame; and determining the object as a tracking target according to the first box and the second box.

22 Claims, 8 Drawing Sheets

(56) References Cited

U.S. PATENT DOCUMENTS

| | | | | |
|---|---|---|---|---|
| 9,576,214 | B1* | 2/2017 | Zhang | G06F 18/2148 |
| 10,520,943 | B2* | 12/2019 | Martirosyan | G06T 7/292 |
| 2016/0275695 | A1* | 9/2016 | Luczak | G06T 7/248 |
| 2018/0285647 | A1* | 10/2018 | Chen | G06V 20/41 |
| 2019/0065885 | A1* | 2/2019 | Li | H04N 7/188 |
| 2019/0114804 | A1* | 4/2019 | Sundaresan | G06V 10/82 |
| 2021/0209797 | A1* | 7/2021 | Lee | G06T 17/00 |

FOREIGN PATENT DOCUMENTS

| | | |
|---|---|---|
| CN | 106598226 | 5/2019 |
| TW | I393074 | 4/2013 |
| TW | 201909660 | 3/2019 |
| WO | 2017096949 | 6/2017 |

OTHER PUBLICATIONS

Matija Radovic, et al., "Object Recognition in Aerial Images Using Convolutional Neural Networks." Journal of Imaging, vol. 3, No. 2, Jun. 14, 2017, pp. 1-9.

Imran Saleemi, et al., "Multiframe Many-Many Point Correspondence for Vehicle Tracking in High Density Wide Area Aerial Videos." Int J Comput Vis, vol. 104, No. 2, Apr. 24, 2013, pp. 1-22.

Dawei Du, et al., "The Unmanned Aerial Vehicle Benchmark: Object Detection and Tracking." ECCV, Mar. 2018, pp. 1-17.

"Office Action of Taiwan Counterpart Application", dated Dec. 3, 2020, p. 1-p. 20.

Imran Saleemi et al., "Multiframe Many-Many Point Correspondence for Vehicle Tracking in High Density Wide Area Aerial Videos", International Journal of Computer Vision 104(2), Apr. 24, 2013, pp. 198-219.

"Notice of allowance of Taiwan Counterpart Application", dated Oct. 4, 2022, p. 1-p. 6.

* cited by examiner

UNMANNED AERIAL VEHICLE AND IMAGE RECOGNITION METHOD THEREOF

CROSS-REFERENCE TO RELATED APPLICATION

This application claims the priority benefit of China application serial no. 202010189501.4, filed on Mar. 18, 2020. The entirety of the above-mentioned patent application is hereby incorporated by reference herein and made a part of this specification.

BACKGROUND

Technical Field

The disclosure relates to an unmanned aerial vehicle (UAV) detection and defense technology, and in particular, to a UAV and an image recognition method thereof.

Description of Related Art

Conventional security systems generally rely on servers with high computing power for object recognition, and a surveillance distance of a security camera generally may not exceed 15 meters. The above condition makes it easy to perform object recognition. On the other hand, since the security camera does not move, the server can easily recognize a moving object by observing whether a scene in an image changes.

In the field of the UAV detection and defense technology, a processor installed on the UAV does not have sufficient computing power due to the limitations of weight and power consumption. Accordingly, the UAV may compress a captured image and transmit, via a wireless network, it to a server for computation. A constantly moving UAV on patrol in the air generally does not have good communication quality. Therefore, it is difficult for the server to fully restore the compressed image transmitted by the UAV and accurately recognize the moving object. On the other hand, the scene of the image captured by the UAV will change with the movement of the UAV, so the server may be incapable of recognizing the moving object by observing whether the scene in the image changes.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

A UAV and an image recognition method applied to a UAV are provided in the invention. The UAV in the invention can accurately recognize, detect, and track an object in a high-resolution image with limited computing power.

To achieve one or some or all of the above objectives or other objectives, a UAV is proposed in the invention, including an image capturing device, a storage medium, and a processor. The image capturing device generates an image data stream, where the image data stream includes a current frame. The storage medium stores a plurality of modules. The processor is coupled to the image capturing device and the storage medium, the processor accesses and executes the modules, and the modules include an object recognition module, a moving object detection module, and an object tracking module. The object recognition module performs image recognition on an object in the current frame to generate a first box corresponding to the current frame. The moving object detection module detects movement of the object to generate a second box corresponding to the current frame. The object tracking module determines the object as a tracking target according to the first box and the second box.

To achieve one or some or all of the above objectives or other objectives, an image recognition method applied to a UAV is proposed in the invention, the image recognition method including: obtaining an image data stream, where the image data frame includes a current frame; performing image recognition on an object in the current frame to generate a first box corresponding to the current frame; detecting movement of the object to generate a second box corresponding to the current frame; and determining the object as a tracking target according to the first box and the second box.

Based on the above, the UAV in the invention can determine, by comparing results of image recognition and moving object detection, that a scene change in a frame is caused by a real moving object, thus accurately identifying, detecting, and tracking the moving object.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

To facilitate the understanding of the invention, the UAV and the image recognition method thereof in the embodiments of the invention are described in detail in the following examples.

A conventional UAV cannot use its computing power to perform image analysis on an image intercepted by the UAV. Instead, it needs to transmit the image to a ground base station (BS) for image recognition. With a limited transmission bandwidth, the conventional UAV cannot transmit large amounts of video data. Since the UAV cannot process high-resolution images, its surveillance range is also limited.

Figure 1A:
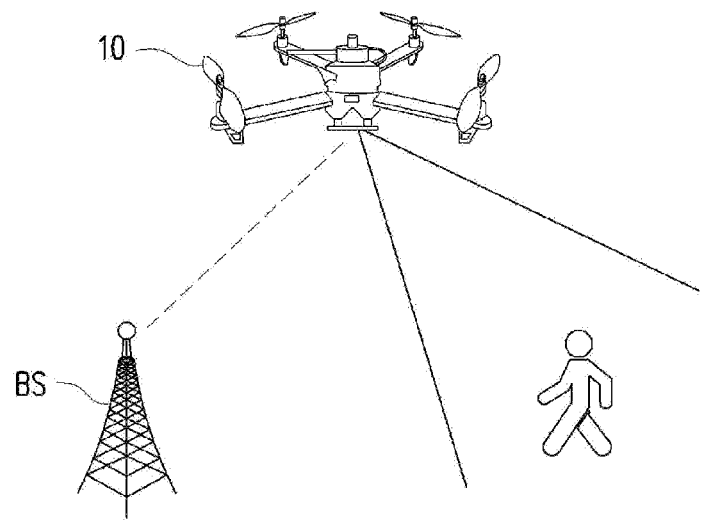
FIG. 1A is a schematic operation diagram of a UAV according to an embodiment of the invention.

In view of this, an image recognition method is proposed in the invention, which can reduce the amount of computation consumed by the UAV in image recognition. Accordingly, the UAV can use its own processor for image recognition and can fly to higher to monitor a wider range, as shown in FIG. 1A. FIG. 1A is a schematic operation diagram of a UAV 10 according to an embodiment of the invention. The UAV 10 may communicate with a ground BS, and when detecting a moving object, the UAV 10 transmits a tracking result of the moving object to the BS.

Figure 1B:
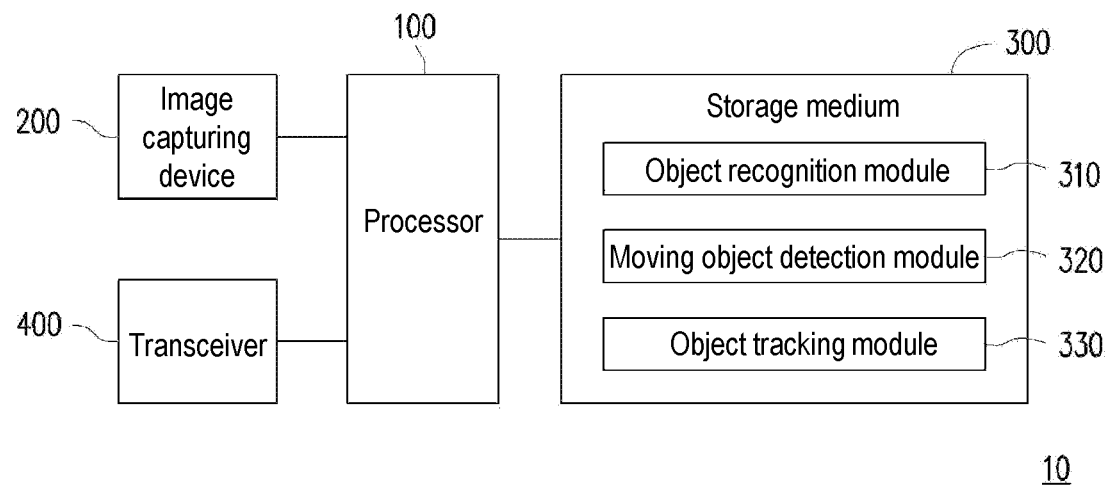
FIG. 1B is a functional block diagram of a UAV according to an embodiment of the invention.

FIG. 1B is a functional block diagram of a UAV 10 according to an embodiment of the invention. The UAV 10 may include a processor 100, an image capturing device 200, a storage medium 300, and a transceiver 400.

The processor 100 is, for example, a central processing unit (CPU), or another programmable general-purpose or special-purpose microprocessor, a digital signal processor (DSP), a programmable controller, an application specific integrated circuit (ASIC), a graphics processing unit (GPU) or other similar elements, or a combination thereof. The processor 100 is coupled to the image capturing device 200, the storage medium 300, and the transceiver 400, and is capable of accessing and executing modules or various applications stored in the storage medium 300.

The image capturing device 200 may be disposed on the UAV 10. The image capturing device 200 may be, for example, an electronic device with an image capturing function such as a video camera or a camera. In the present embodiment, the image capturing device 200 is configured to shoot an image to generate an image data stream.

The storage medium 300 is, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 100. In the present embodiment, the storage medium 300 may store a plurality of modules such as an object recognition module 310, a moving object detection module 320, and an object tracking module 330, and functions thereof will be described later.

The transceiver 400 transmits and receives signals wirelessly or wiredly. The transceiver 400 may be, for example, a transmitting and receiving hardware device based on Bluetooth, Wi-Fi, Zigbee or other wireless transmission, configured to receive and send signals, but is not limited thereto. The transceiver 400 may also perform such operations as low noise amplifying (LNA), impedance matching, frequency mixing, up-down frequency conversion, filtering, amplification, and similar operations. In the present embodiment, after the UAV 10 has recognized an object from the image data stream and identified the object as the tracking target to generate an identified image data stream, the transceiver 400 can send an instruction of the identified image data stream or an instruction to indicate the object as the tracking target.

Figure 2:
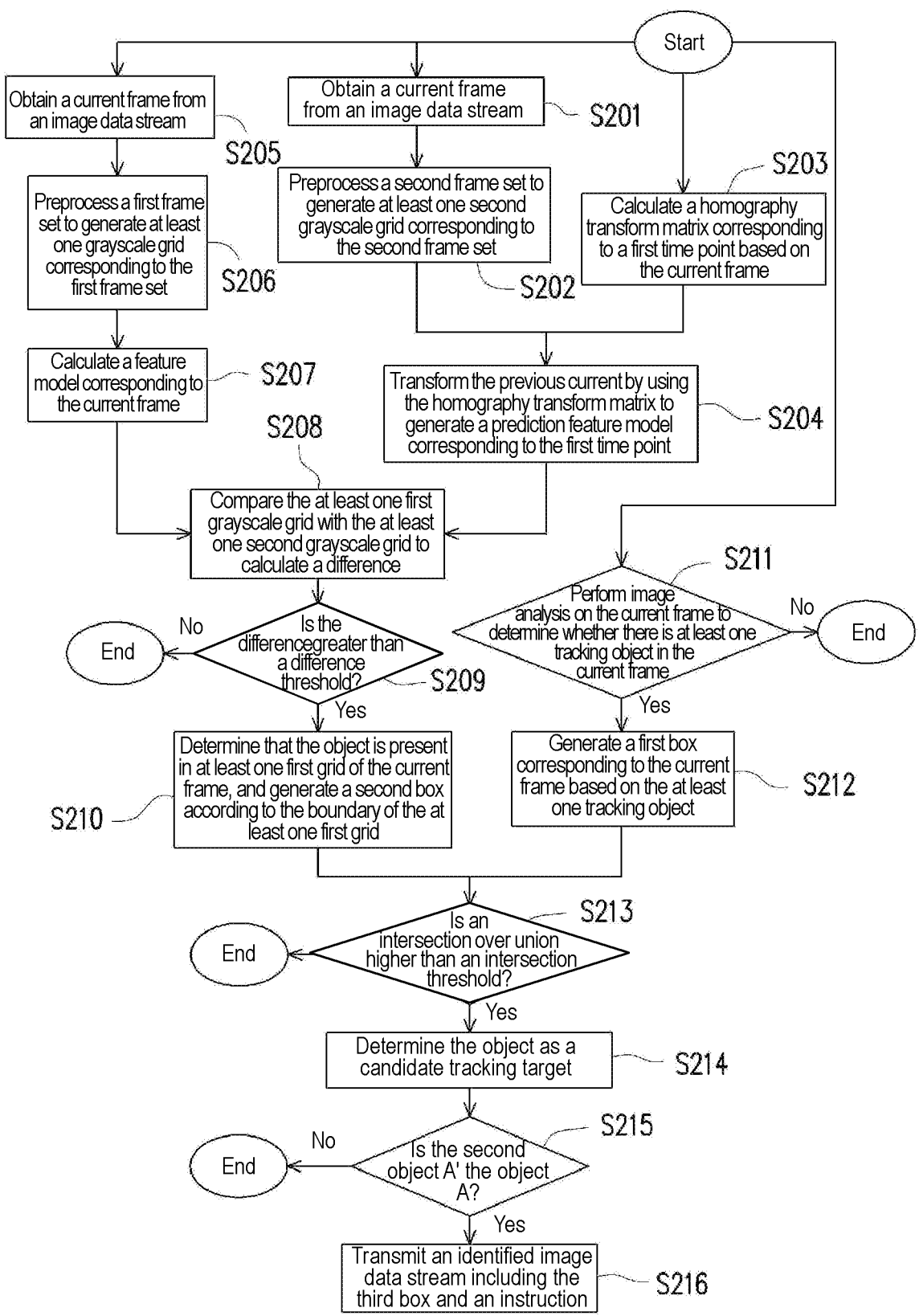
FIG. 2 is a flowchart of image recognition performed by a UAV according to an embodiment of the invention.

FIG. 2 is a flowchart of image recognition performed by a UAV 10 according to an embodiment of the invention.

In the present embodiment, image data is generated by an image capturing device 200, and the image data stream includes a current frame and a previous frame. The previous frame corresponds to a second time point T2, the current frame corresponds to a first time point T1, and the second time point T2 is earlier than the first time point T1, where $T1-T2>0$. In other words, the time point when the previous frame is present in the image data stream is earlier than that when the current frame is present in the image data stream.

Figure 3A:
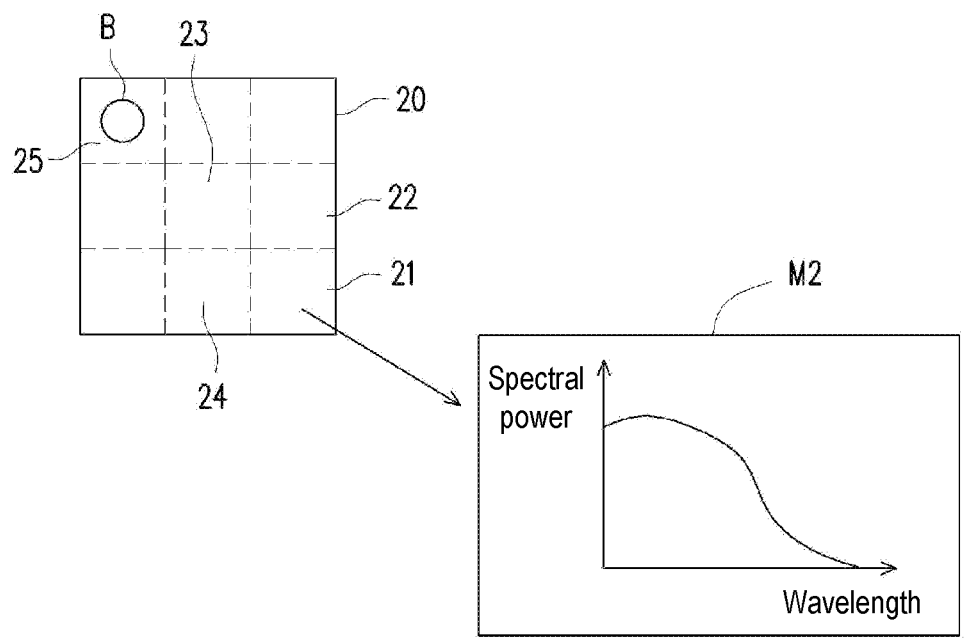
FIG. 3A and FIG. 3B are schematic diagrams of a previous frame and a current frame according to an embodiment of the invention.
Figure 3B:
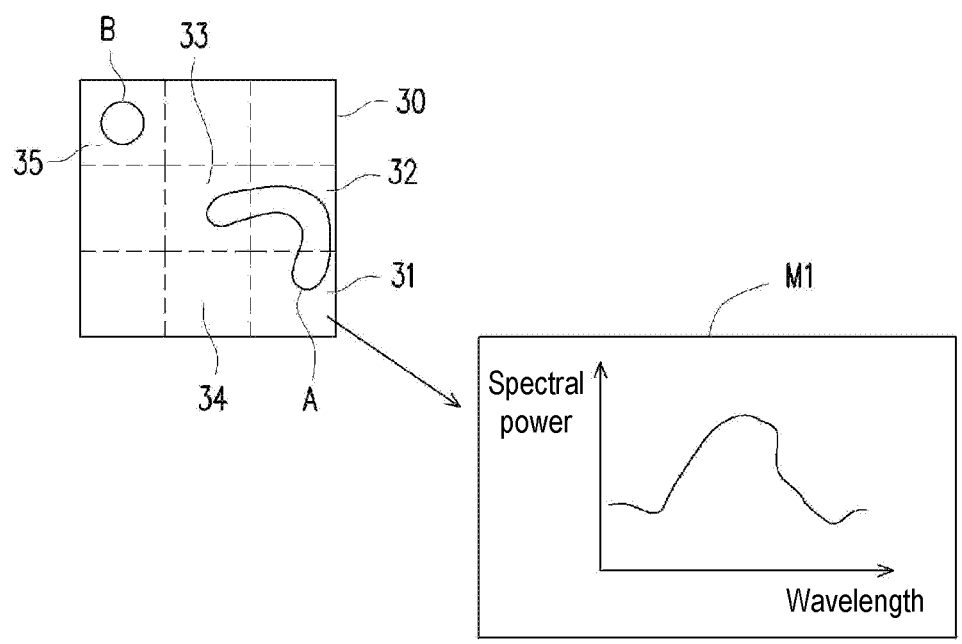

For ease of description, FIG. 3A and FIG. 3B are schematic diagrams of a previous frame 20 and a current frame 30 according to an embodiment of the invention.

Refer to FIG. 2. A moving object detection module 320 may detect movement of the object to generate a second box W2 corresponding to the current frame 30. A specific process is as described in step S201 to step S210.

In step S201, the moving object detection module 320 obtains a current frame 20 from an image data stream, where the current frame 20 includes image data in the image data stream corresponding to the second time point T2.

In step S202, the moving object detection module 320 preprocesses a second frame set to generate at least one second grayscale grid corresponding to the second frame set. Specifically, the moving object detection module 320 may receive the second frame set from the image data stream to calculate a prediction feature model corresponding to the current frame 20. The second frame set may include the current frame 20. In some embodiments, the second frame set may further include frames within a second time interval backward from the second time point T2 (corresponding to the previous frame 20). For example, assuming that the second time interval is t2 (e.g., 10 s), the second frame set may include one or more frames of the image data stream from a time point (T2−t2) to the time point T2. For example, T2 may be the 150th second, t2 may be 10 seconds, and the second frame set may include one or more frames (e.g., 30 frames) of the image data stream from the time point of the 140th second to the time point of the 150th second. The moving object detection module 320 may split and convert at least one frame in the second frame set into a grayscale, thereby generating at least one second grayscale grid corresponding to the second frame set. In the subsequent step S204, the prediction feature model corresponding to the current frame 20 may be calculated using the at least one second grayscale grid. It should be noted that the preprocessing manner can be adjusted by users according to actual requirements, and the invention is not limited thereto.

In step S203, the moving object detection module 320 calculates a homography transform matrix corresponding to a first time point T1 based on the current frame 30. The homography transform matrix may be calculated, for example, according to a third frame set. The third frame set includes the current frame 30. In some embodiments, the third frame set may also include frames within a third time interval backward from the first time point T1 (corresponding to the current frame 30). For example, assuming that the third time interval is t3, the third frame set may include one or more frames (e.g., 30 frames) of the image data stream from a time point (T143) to the time point T1. For example, t3 may be the 5th second, and then the third frame set may include one or more frames (i.e., 15 frames) of the image data stream from the current number of seconds to the first five seconds of the current number of seconds.

In step S204, the moving object detection module 320 transforms the previous current 20 by using the homography transform matrix to generate a prediction feature model corresponding to the first time point T1. More specifically, the moving object detection module 320 may transform the at least one second grayscale grid of the previous current 20 corresponding to the second time point T2 by using the homography transform matrix corresponding to the first time point T1. Take FIG. 3A as an example. In FIG. 3A, it is assumed that the moving object detection module 320 splits and converts the previous frame 20 corresponding to the second time point T2 into a grayscale, thus generating a second grayscale grid 21, a second grayscale grid 22, a second grayscale grid 23, and a second grayscale grid 24 corresponding to the second frame set. The moving object detection module 320 may transform the second grayscale grid 21 by using a homography transform matrix, thus calculating the prediction feature model corresponding to the first time point T1 according to the second grayscale grid 21 corresponding to the second time point T2. The prediction feature model may be, for example, a spectral power distribution model M2 as shown in FIG. 3A, but the invention is not limited thereto.

Referring back to FIG. 2, in step S205, the moving object detection module 320 obtains a current frame 30 from an image data stream, where the current frame 30 includes image data in the image data stream corresponding to the first time point T1.

In step S206, the moving object detection module 320 preprocesses a first frame set to generate at least one grayscale grid corresponding to the first frame set. Specifically, the moving object detection module 320 may receive the first frame set from the image data stream to calculate a feature model corresponding to the current frame 30. The first frame set may include the current frame 30. In some embodiments, the first frame set may further include frames within a first time interval backward from the first time point T1 (corresponding to the current frame 30). For example, assuming that the first time interval is t1 (e.g., 1 second), the first frame set may include one or more frames of the image data stream from a time point (T141) to the time point T1. For example, T1 may be the 200th second, t1 may be 20 seconds, and the second frame set may include one or more frames (e.g., 60 frames) of the image data stream from the time point of the 180th second to the time point of the 200th second. The moving object detection module 320 may split and convert at least one frame in the first frame set into a grayscale, thus generating at least one first grayscale grid corresponding to the first frame set.

In step S207, the moving object detection module 320 calculates a feature model corresponding to the current frame 30. Specifically, the moving object detection module 320 may generate a feature model according to the at least one first grayscale grid. Take FIG. 3B as an example. In FIG. 3B, it is assumed that the moving object detection module 320 splits and converts the current frame 30 corresponding to the first time point T1 into a grayscale, thus generating a first grayscale grid 31, a first grayscale grid 32, a first grayscale grid 33, and a first grayscale grid 34 corresponding to the first frame set. The moving object detection module 320 may calculate a feature model corresponding to the first time point T1 according to the first grayscale grid 31 corresponding to the first time point T1. The feature model may be, for example, a spectral power distribution model M1 as shown in FIG. 3B, but the invention is not limited thereto.

According to FIG. 3A and FIG. 3B, no object exists in the second grayscale grid 21 of the previous frame 20 at the second time point T2. Therefore, the spectral power distribution model M2 calculated based on the second grayscale grid 21 corresponds to the situation where no object exists. After the arrival at the first time point T1 over time, an object A is present in the first grayscale grid 31 of the current frame 30. Therefore, the spectral power distribution model M1 calculated based on the first grayscale grid 31 corresponds to the situation where the object A is present.

Referring back to FIG. 2, in step S208, the moving object detection module 320 compares the at least one first grayscale grid with the at least one second grayscale grid to calculate a difference. By taking FIG. 3A and FIG. 3B as an example, the moving object detection module 320 may calculate a difference between the spectral power distribution model M1 (i.e., the feature model) corresponding to the first grayscale grid 31 and the spectral power distribution model M2 (i.e., the prediction feature model) corresponding to the second grayscale grid 21. The difference may be correlated to, for example, a mean value or a variance of the spectral power distribution model M1 and the spectral power distribution model M2 or other kinds of statistical parameters, or correlated to KL-divergence and other types of measures between the spectral power distribution model M1 and the spectral power distribution model M2.

Referring to back to FIG. 2, in step S209, the moving object detection module 320 determines whether the difference exceeds a difference threshold. If the difference between the spectral power distribution model M1 and the spectral power distribution model M2 exceeds the difference threshold, the method proceeds to step S210. If the difference is below the difference threshold, the process of performing image recognition by the UAV 10 is stopped.

By taking FIG. 3A and FIG. 3B as an example, since the object A is not present in the previous frame 20 at the second time point T2, the spectral power distribution model M2 (i.e., the prediction feature model) predicted by the moving object detection module 320 according to the previous frame 20 does not include information of the object A. However, the object A is present in the current frame 30 at the first time point T1. Therefore, the spectral power distribution model M1 (i.e., the feature model) calculated by the moving object detection module 320 according to the current frame 30 is affected by the object A and changes, thus resulting in that the difference between the spectral power distribution model M1 and the spectral power distribution model M2 exceeds the difference threshold. Based on the difference between the spectral power distribution model M1 and the spectral power distribution model M2 exceeding the difference threshold, the moving object detection module 320 may determine that the object A in the first grayscale grid 31 is a moving object. On the other hand, an object B in the previous frame 20 and the current frame 30 does not move; therefore, no significant difference exists between the prediction feature model corresponding to the second grayscale grid 25 and the feature model corresponding to the first grayscale grid 35 (i.e., the difference between the prediction feature model and the feature model does not exceed the difference threshold).

Accordingly, the moving object detection module 320 does not regard the object B as a moving object.

Figure 3C:
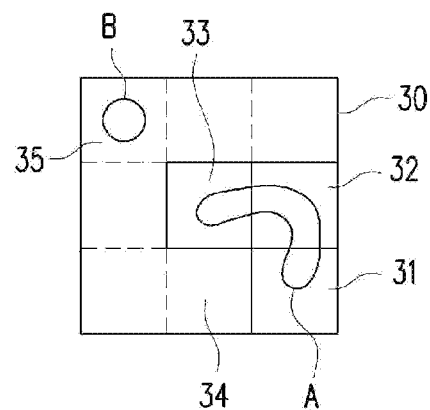
FIG. 3C, FIG. 3D, FIG. 3E, and FIG. 3F are schematic diagrams of movement of an object detected by a moving object detection module according to an embodiment of the invention.
Figure 3D:
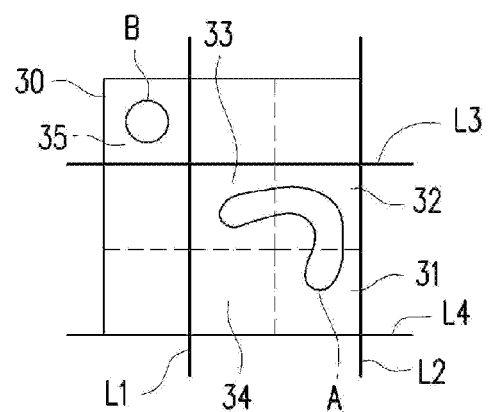
Figure 3E:
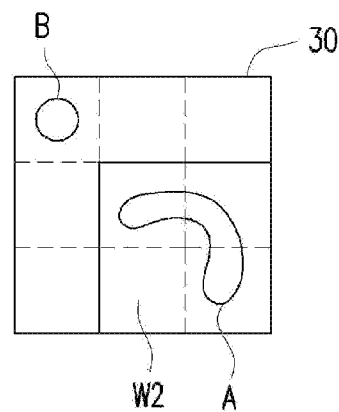

Referring back to FIG. 2, in step S210, the moving object detection module 320 determines that the object is present in at least one first grid of the current frame, and generates a second box W2 (as shown in FIG. 3E) according to the boundary of the at least one first grid. FIG. 3C, FIG. 3D, FIG. 3E, and FIG. 3F are schematic diagrams of movement of an object A detected by a moving object detection module 320 according to an embodiment of the invention. In FIG. 3C, the moving object detection module 320 determines that the object A is present in the first grayscale grid 31 in step S209. Similarly, the moving object detection module 320 may also determine, in the same manner as step S209, that the object A is present in the first grayscale grid 32 and the first grayscale grid 33. Accordingly, the moving object detection module 320 may generate the second box W2 according to line segments L1, L2, L3, and L4 extending from boundaries of the first grayscale grid 31, the first grayscale grid 32, and the first grayscale grid 33, as shown in FIG. 3D and FIG. 3E, where the second box W2 is a maximum area that can be enclosed by the line segments extending from the boundaries of the first grayscale grid 31, the first grayscale grid 32, and the first grayscale grid 33. On the other hand, since the object B is not a moving object in the current frame 30, the moving object detection module 320 does not generate a box corresponding to the object B.

Figure 3F:
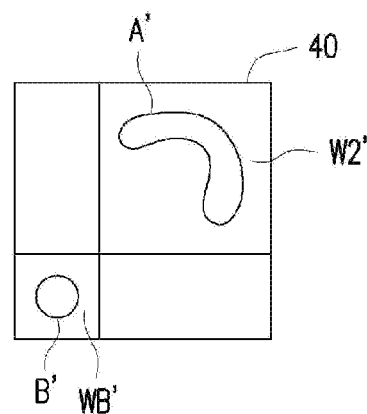

Referring to FIG. 3F, at the third time point T3, the moving object detection module 320 may detect second movement of a second object A' in a third frame 40 corresponding to the third time point T3, thereby generating a third box W2' corresponding to the third frame 40, where the first time point T1 is earlier than the third time point T3. On the other hand, the moving object detection module 320 may detect movement of an object B' in the third frame 40 corresponding to the third time point T3, thereby generating a box WB' corresponding to the third frame 40. In the subsequent step, the moving object detection module 320 may know the movement of the object A (i.e., the second object A') based on the result of determining which one of the second object A' in the third box W2' and the object B' in the box WB' should correspond to the object A (as shown in FIG. 3E) in the current frame 30, thus achieving an effect of tracking the object A.

The object recognition module 310 can be configured to perform image recognition on the object in the current frame 30 to generate a first box corresponding to the current frame 30. A specific process is as described in step S211 to step S212.

Referring back to FIG. 2, in step S211, the object recognition module 310 performs image analysis on the current frame 30 to determine whether there is at least one tracking object in the current frame 30. In brief, if there is at least one tracking object in the current frame, the method proceeds to step S212. If there is no tracking object in the current frame, the process of performing image recognition by the UAV 10 is stopped.

Figure 4A:
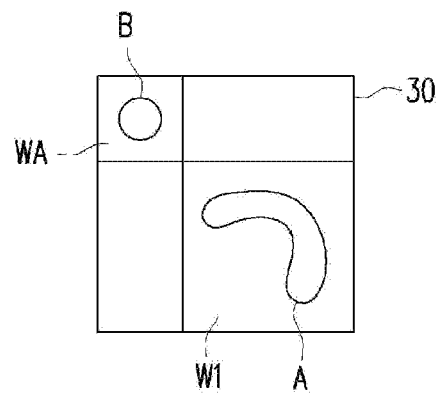
FIG. 4A and FIG. 4B are schematic diagrams of image recognition performed on an object by an object recognition module according to an embodiment of the invention.
Figure 4B:
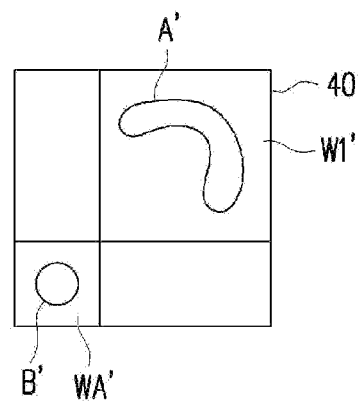

In step S212, the object recognition module 310 may generate a first box W1 corresponding to the current frame based on the at least one tracking object. FIG. 4A and FIG. 4B are schematic diagrams of image recognition performed on objects A and B by an object recognition module 310 according to an embodiment of the invention. Referring to FIG. 4A, the object recognition module 310 may perform image analysis on the current frame 30, for example, the object recognition module 310 may perform image analysis on the current frame 30 by using a neural network, thus recognizing an object in the current frame 30 from the appearance. Next, the object recognition module 310 may determine that an object A or B that can be taken as a tracking target exists in the current frame 30. Accordingly, the object recognition module 310 may generate a first box W1 corresponding to the current frame 30 based on the object A. Similarly, the object recognition module 310 may generate a box WA corresponding to the current frame 30 based on the object B.

Referring to FIG. 4B, at the third time point T3, the object recognition module 310 may perform image analysis on a third frame 40 corresponding to the third time point T3, thus recognizing an object existing in the third frame 40. Next, the object recognition module 310 may determine that an object A' or B' that can be taken as a tracking object exists in the third frame 40. Accordingly, the object recognition module 310 may generate a box W1' corresponding to the third frame 40 based on the object A'. Similarly, the object recognition module 310 may generate a box WA' corresponding to the third frame 40 based on the object B'.

The object recognition module 310 may determine the object A as a tracking object according to the first box W1 and the second box W2. A specific process is as described in step S213 to step S216.

Referring back to FIG. 2, in step S213, the object tracking module 330 calculates an intersection over union (IOU) between the first box W1 and the second box W2, and determines whether the IOU is higher than an intersection threshold. If the IOU is lower than the intersection threshold, the method proceeds to step S214. If the IOU is below the intersection threshold, the process of performing image recognition by the UAV 10 is stopped. In step S214, the object tracking module 330 determines the object A as a candidate tracking target. Specifically, the object tracking module 330 may determine, based on the IOU between the first box W1 and the second box W2 being higher than the intersection threshold, that the first box W1 generated by the object recognition module 310 and the second box W2 generated by the moving object detection module 320 select the same object A. In other words, both the object recognition module 310 and the moving object detection module 320 detect the existence of the object A. After double checking by the object recognition module 310 and the moving object detection module 320, the probability of the UAV 10 misjudging the object A as a moving object is significantly reduced.

By taking FIG. 3E and FIG. 4A as an example, according to FIG. 3E, the moving object detection module 320 may generate the second box W2 by tracking the movement of the object A. According to FIG. 4, the object recognition module 310 may generate the first box W1 by performing image analysis on the current frame 30. The object tracking module 330 may determine, based on the IOU between the first box W1 and the second box W2 being higher than the intersection threshold, the object A in the first box W1 or the second box W2 as a candidate tracking target.

Referring back to FIG. 2, in step S215, the object tracking module 330 may determine whether the second object A' in the third frame 40 is the object A. If the second object A' is the object A, the method proceeds to step S216. If the second object A' is not the object A, the process of performing image recognition by the UAV 10 is stopped.

Figure 5:
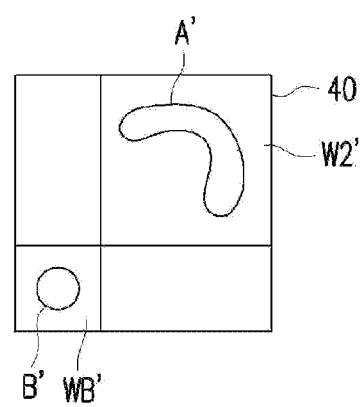
FIG. 5 is a schematic diagram of determination of an object as a tracking target by an object tracking module according to an embodiment of the invention.

FIG. 5 is a schematic diagram of determination of an object A as a tracking target by an object tracking module 330 according to an embodiment of the invention. Referring to FIG. 3E, FIG. 3F, and FIG. 5, the object tracking module 330 may determine the second object A' and the object B' as candidate tracking targets in the same manner as step S201 to step S214. Next, the object tracking module 330 may determine, according to center-point positions of the second box W2 and the third box W2', whether the second object A' in FIG. 3F is the object A in FIG. 3E. Specifically, the object tracking module 330 may determine, according to center-point positions of the second box W2 and the third box W2' and center-point positions of the second box W2 and the box WB', which one of the second object A' and the object B' of the candidate tracking targets in FIG. 3F is the object A in the current frame 30. For example, the object tracking module 330 may determine, according to a distance between center points of the second box W2 and the third box W2' being shorter than that between center points of the second box W2 and the box WB', that the second object A' in the third frame 40 is the object A in the current frame 30. Accordingly, the object tracking module 330 may determine the second object A' (i.e., the object A) of the candidate tracking target as a tracking target.

In step S216, the object tracking module 330 transmits an identified image data stream including the third box W2' and/or an instruction by the transceiver 400, where the instruction indicates that the second object A' (i.e., the object A) is the tracking target. After the base station (e.g., the BS as shown in FIG. 1) receives the identified image data stream and/or the instruction, a display device in the base station may display the identified image data stream where the tracking target (i.e., the object A) is marked to a safety manager. Based on the identified image data stream and/or the instruction, the safety manager can clearly identify the tracking target (i.e., the object A) from the display device.

Figure 6:
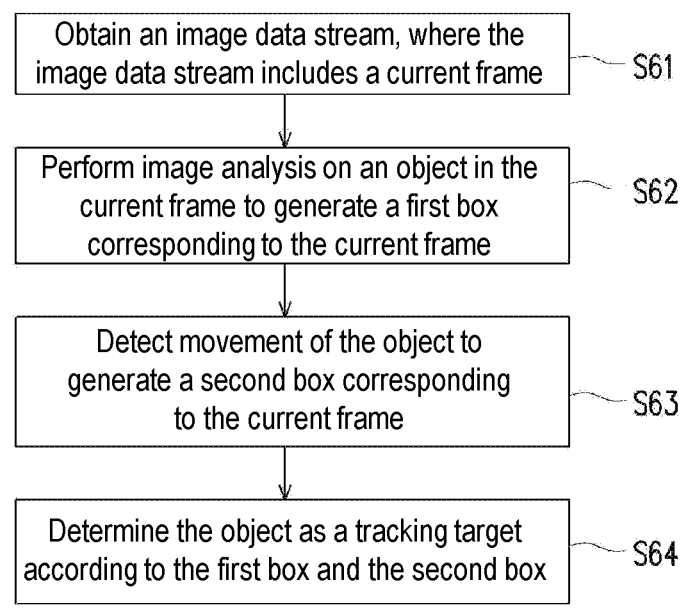
FIG. 6 is a flowchart of an image recognition method according to an embodiment of the invention.

FIG. 6 is a flowchart of an image recognition method according to an embodiment of the invention, where the image recognition method may be implemented by a UAV 10. In step S61, an image data stream is obtained by an image capturing device 200, where the image data stream includes a current frame. In step S62, an object recognition module 310 performs image analysis on an object in the current frame to generate a first box corresponding to the current frame. In step S63, a moving object detection module 320 detects movement of the object to generate a second box corresponding to the current frame. In step S64, an object tracking module 330 determines the object as a tracking target according to the first box and the second box.

Based on the above, the UAV in the invention can perform image recognition and moving object detection on an image data stream. By comparing the results of image recognition and moving object detection, the UAV can effectively determine for the user whether a scene change in the frame is caused by the real moving object or by the movement of the UAV. Therefore, even if the UAV is constantly moving, the UAV may not misjudge the presence of a moving object in a monitored area due to a scene change caused by the UAV itself. On the other hand, the moving object detection technology proposed in the invention does not require feature extraction and feature analysis on an image in a frame when object moving detection is performed, which can thus significantly reduce the computation amount required and enable the UAV to complete the moving object detection through its own processor.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An unmanned aerial vehicle comprising an image capturing device, a storage medium, and a processor, wherein
the image capturing device is configured to generate an image data stream, wherein the image data stream comprises a current frame; and
the processor is coupled to the image capturing device and the storage medium, wherein
the processor is configured to perform image recognition on an object in the current frame to generate a first box corresponding to the current frame,
the processor is configured to detect movement of the object to generate a second box corresponding to the current frame according to a difference between a feature model corresponding to the current frame and a prediction feature model corresponding to the previous frame, and
the processor is configured to calculate an intersection over union between the first box and the second box, and determine the object as a tracking target based on the intersection over union being higher than an intersection threshold.

2. The unmanned aerial vehicle according to claim 1, wherein
the processor is configured to receive a first frame set and a second frame set from the image data stream to calculate the feature model and the prediction feature model, wherein
the first frame set comprises the current frame and is used to calculate the feature model corresponding to the current frame, and
the second frame set comprises a previous frame and is used to calculate the prediction feature model corresponding to the previous frame.

3. The unmanned aerial vehicle according to claim 2, wherein the processor calculates a homography transform matrix corresponding to a first time point based on the current frame to transform the previous frame by using the homography transform matrix to generate the prediction feature model corresponding to the first time point.

4. The unmanned aerial vehicle according to claim 3, wherein the first frame set comprises frames within a first time interval backward from the first time point corresponding to the current frame, and the second frame set comprises frames within a second time interval backward from a second time point corresponding to the previous frame.

5. The unmanned aerial vehicle according to claim 2, wherein the processor preprocesses the first frame set and the second frame set, wherein the preprocessing comprises splitting and converting at least one frame in the first frame set and the second frame set into a grayscale to generate at least one first grayscale grid corresponding to the first frame set and at least one second grayscale grid corresponding to the second frame set.

6. The unmanned aerial vehicle according to claim 5, wherein processor generates the feature model according to the at least one first grayscale grid, and converts the at least one second grayscale grid by using a homography transform matrix to generate the prediction feature model.

7. The unmanned aerial vehicle according to claim 5, wherein the processor compares the at least one first grayscale grid with the at least one second grayscale grid to calculate the difference.

8. The unmanned aerial vehicle according to claim 2, wherein the processor determines, based on the difference exceeding a difference threshold, that the object is present in at least one first grid of the current frame, and generates the second box according to a boundary of the at least one first grid.

9. The unmanned aerial vehicle according to claim 1, wherein the processor performs image analysis on the current frame to determine whether there is at least one tracking object in the current frame, and generates the first box corresponding to the current frame based on the at least one tracking object.

10. The unmanned aerial vehicle according to claim 1, wherein the moving object detection module detects second movement of a second object to generate a third box corresponding to a third frame, and the object tracking module determines whether the second object is the object according to center-point positions of the second box and the third box, wherein the third frame corresponds to a third time point and the first time point is earlier than the third time point.

11. The unmanned aerial vehicle according to claim 10, further comprising:
a transceiver coupled to the processor, wherein the transceiver is configured to transmit an identified image data stream comprising the third box and an instruction, wherein the instruction indicates that the second object is the tracking target.

12. An image recognition method, applied to an unmanned aerial vehicle, wherein the image recognition method comprises:
obtaining an image data stream, wherein the image data frame comprises a current frame;
performing image recognition on an object in the current frame to generate a first box corresponding to the current frame;
detecting movement of the object to generate a second box corresponding to the current frame according to a difference between a feature model corresponding to the current frame and a prediction feature model corresponding to a previous frame; and
calculating an intersection over union between the first box and the second box, and determining the object as a tracking target based on the intersection over union being higher than an intersection threshold.

13. The image recognition method according to claim 12, wherein the step of detecting the movement of the object to generate the second box corresponding to the current frame comprises:
receiving a first frame set and a second frame set from the image data stream to calculate the feature model and the prediction feature model, wherein
the first frame set comprises the current frame and is used to calculate the feature model corresponding to the current frame, and
the second frame set comprises a previous frame and is used to calculate the prediction feature model corresponding to the previous frame.

14. The image recognition method according to claim 13, wherein the step of receiving the first frame set and the second frame set from the image data stream to calculate the feature model and the prediction feature model comprises:
calculating a homography transform matrix corresponding to a first time point based on the current frame to transform the previous frame by using the homography transform matrix to generate the prediction feature model corresponding to the first time point.

15. The image recognition method according to claim 14, wherein the first frame set comprises frames within a first time interval backward from the first time point corresponding to the current frame, and the second frame set comprises frames within a second time interval backward from a second time point corresponding to the previous frame.

16. The image recognition method according to claim 13, wherein the image recognition method further comprises:
preprocessing the first frame set and the second frame set, wherein the preprocessing comprises splitting and converting at least one frame in the first frame set and the second frame set into a grayscale to generate at least one first grayscale grid corresponding to the first frame set and at least one second grayscale grid corresponding to the second frame set.

17. The image recognition method according to claim 16, wherein the step of receiving the first frame set and the second frame set from the image data stream to calculate the feature model and the prediction feature model comprises:
generating the feature model according to the at least one first grayscale grid, and converting the at least one second grayscale grid by using a homography transform matrix to generate the prediction feature model.

18. The image recognition method according to claim 16, further comprising:
comparing the at least one first grayscale grid with the at least one second grayscale grid to calculate the difference.

19. The image recognition method according to claim 13, wherein the step of generating the second box corresponding to the current frame according to the difference between the feature model and the prediction feature model comprises:
determining, based on the difference exceeding a difference threshold, that the object is present in at least one first grid of the current frame, and generating the second box according to a boundary of the at least one first grid.

20. The image recognition method according to claim 13, further comprising:
- detecting second movement of a second object to generate a third box corresponding to a third frame, and determining whether the second object is the object according to center-point positions of the second box and the third box, wherein the third frame corresponds to a third time point and the first time point is earlier than the third time point.

21. The image recognition method according to claim 20, further comprising:
- transmitting an identified image data stream comprising the third box and an instruction, wherein the instruction indicates that the second object is the tracking target.

22. The image recognition method according to claim 12, wherein the step of performing image recognition on the object in the current frame to generate the first box corresponding to the current frame comprises:
- performing image analysis on the current frame to determine whether there is at least one tracking object in the current frame, and generating the first box corresponding to the current frame based on the at least one tracking object.

* * * * *